UNITED STATES PATENT OFFICE 2,529,494

CHLOROALKYL ARYLOXYALKYL SULFITES AS NEW CHEMICALS AND INSECTICIDES

Walter D. Harris, Naugatuck, Herman D. Tate, Woodbridge, and John W. Zukel, Hamden, Conn., assignors to United States Rubber Company, New York, N. Y., a corporation of New Jersey No Drawing. Application October 29, 1948, Serial No. 57,413

10 Claims. (Cl. 167—30)

This invention relates to improvements in insecticides, particularly for the control of mites.

The insecticides of the present invention are new compounds, namely, the di-esters of sulfurous acid wherein one of the esterifying groups is a chloroalkyl radical containing 2 to 4 carbon atoms and 1 to 3 chlorine atoms and having no chlorine atom attached to the alpha carbon atom, and the other esterifying group is a radical of the formula R—O—X—, wherein R is selected from the class consisting of monovalent aryl hydrocarbon radicals and such radicals substituted by at least one member of the group consisting of alkyl, alkoxy, cycloalkyl, halo and nitro, and X is an alkylene radical having 2 to 4 carbon atoms. The reason for the requirement that no chlorine atom be attached to the alpha carbon atom of the chloroalkyl radical is that a chlorine attached to a carbon which is attached to an oxygen, is too reactive a chlorine atom. The chemicals of the present invention may be represented by the general formula

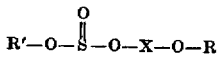

in which R' is a chloroalkyl radical containing 2 to 4 carbon atoms and 1 to 3 chlorine atoms and having no chlorine atom attached to the alpha carbon atom, X is an alkylene radical having 2 to 4 carbon atoms, and R is an aromatic radical. The preparation of these mixed sulfites is carried out by reacting the selected chloroalkyl chlorosulfinate with the selected aryloxyalkanol (or glycol monoaryl ether). The chloroalkyl chlorosulfinate may be prepared by reacting the selected chloroalkanol containing 2 to 4 carbon atoms and 1 to 3 chlorine atoms with thionyl chloride to form the chloroalkyl chlorosulfinate. This is a well known reaction. It is desirable, but not essential, that the alpha carbon atom of the chloroalkyl radical be attached to at least one hydrogen atom since the chloro-tertiary-butyl esters are somewhat difficult to prepare, particularly the mono-chloro-tertiary-butyl ester, due to the tendency toward dehydration of the chlorotertiary butanols in the presence of acidic reagents. The aryloxyalkanol, or glycol mono-aryl ether, may be prepared by reacting the selected alkylene monochlorhydrin with the selected phenol. This is a well known reaction. The last two mentioned reactions, and the reaction of a chloroalkyl chlorosulfinate with an aryloxyalkanol to give a product of the present invention is illustrated by the following reactions, using the preparation of 2-chloroethyl 2-(p-methylphenoxy)-ethyl sulfite as an example:

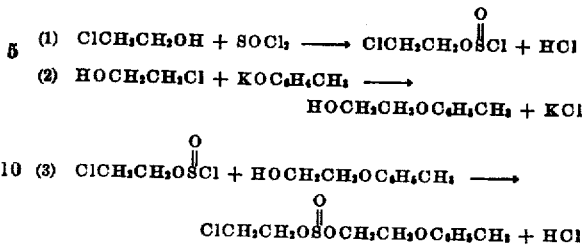

The ethylene chlorhydrin in the first step may be substituted by ethylene oxide. The epichlorhydrin of the second step may also be substituted by ethylene oxide. The intermediate chlorosulfinates obtained in the first step are somewhat unstable, decomposing to sulfur dioxide and the polyhaloalkane (ethylene chloride in the above preparation). They are, however, stable enough that they can be distilled under reduced pressure and stored for a short period with only slight decomposition. The reaction of the chloroalkyl chlorosulfinate with the aryloxyalkanol or glycol mono-aryl ether (as exemplified by the third step above) is conveniently carried out in the presence of a proton acceptor such as pyridine, dimethylaniline, or trimethylamine to sequester the hydrogen chloride, and in a solvent such as benzene, xylene or solvent naphtha. A wide variation in temperature is possible, but temperatures between 20° C. and 50° C. are most convenient. The pyridine or other hydrogen chloride sequestering agent may be omitted if the reaction is carried out under reduced pressure or in the presence of a dry inert gas such as air or nitrogen.

Examples of sulfurous acid di-esters of the present invention illustrating particularly variations in the aryloxyalkyl esterifying group are:

2-chloroethyl 2-phenoxyethyl sulfite
2-chloroethyl 2-(1-naphthoxy)-ethyl sulfite
2-chloroethyl 2-(naphthoxy)-ethyl sulfite
2-chloroethyl 2-(o-chlorophenoxy)-ethyl sulfite
2-chloroethyl 2-(p-chlorophenoxy)-ethyl sulfite
2-chloroethyl 2-(2,4-dichlorophenoxy - ethyl sulfite
2-chloroethyl 2-(2,4,5-trichlorophenoxy) - ethyl sulfite
2-chloroethyl 2-(2,4,6-trichlorophenoxy) - ethyl sulfite
2-chloroethyl 2-(2,4,5,6 - tetrachlorophenoxy) - ethyl sulfite
2-chloroethyl 2 - (pentachlorophenoxy) - ethyl sulfite 2-chloroethyl 2-(p-bromophenoxy)-ethyl sulfite
2-chloroethyl 2-(p-fluorophenoxy)-ethyl sulfite
2-chloroethyl 2-(o-methylphenoxy)-ethyl sulfite
2-chloroethyl 2-(m-methylphenoxy)-ethyl sulfite
2-chloroethyl 2-(p-methylphenoxy)-ethyl sulfite
2-chloroethyl 2-(p-ethylphenoxy)-ethyl sulfite
2-chloroethyl 2-(p-isopropylphenoxy)-ethyl sulfite
2-chloroethyl 2-(p-isobutylphenoxy)-ethyl sulfite
2-chloroethyl 2-(o-tert.-butylphenoxy)-ethyl sulfite
2-chloroethyl 2-(p-tert.-butylphenoxy)-ethyl sulfite
2-chloroethyl 2-(p-tert.-amylphenoxy)-ethyl sulfite
2-chloroethyl 2-(p-octylphenoxy)-ethyl sulfite
2-chloroethyl 2-(o-cyclohexylphenoxy)-ethyl sulfite
2-chloroethyl 2-(p-cyclohexylphenoxy)-ethyl sulfite
2-chloroethyl 2-(p-methoxyphenoxy)-ethyl sulfite
2-chloroethyl 2-(4-n-propyl-2,6-dimethoxyphenoxy)-ethyl sulfite
2-chloroethyl 2-(o-nitrophenoxy)-ethyl sulfite
2-chloroethyl 2-(p-nitrophenoxy)-ethyl sulfite
2-chloroethyl 2-(o-chloro-p-nitrophenoxy)-ethyl sulfite
2-chloroethyl 2-(p-chloro-o-nitrophenoxy)-ethyl sulfite
2-chloroethyl 2-(2-chloro-4-tert.-butylphenoxy)-ethyl sulfite
2-chloroethyl 2-(2,6-dichloro-4-tert.-butylphenoxy)-ethyl sulfite
2-chloroethyl 3-phenoxypropyl sulfite
2-chloroethyl 3-(1-naphthoxy)-propyl sulfite
2-chloroethyl 3-(2-naphthoxy)-propyl sulfite
2-chloroethyl 3-(o-chlorophenoxy)-propyl sulfite
2-chloroethyl 3-(p-chlorophenoxy)-propyl sulfite
2-chloroethyl 3-(2,4-dichlorophenoxy)-propyl sulfite
2-chloroethyl 3-(2,4,5-trichlorophenoxy)-propyl sulfite
2-chloroethyl 3-(2,4,6-trichlorophenoxy)-propyl sulfite
2-chloroethyl 3-(2,4,5,6-tetrachlorophenoxy)-propyl sulfite
2-chloroethyl 3-(pentachlorophenoxy)-propyl sulfite
2-chloroethyl 3-(p-bromophenoxy)-propyl sulfite
2-chloroethyl 3-(p-fluorophenoxy)-propyl sulfite
2-chloroethyl 3-(o-methylphenoxy)-propyl sulfite
2-chloroethyl 3-(m-methylphenoxy)-propyl sulfite
2-chloroethyl 3-(p-methylphenoxy)-propyl sulfite
2-chloroethyl 3-(p-ethylphenoxy)-propyl sulfite
2-chloroethyl 3-(p-isopropylphenoxy)-propyl sulfite
2-chloroethyl 3-(p-isobutylphenoxy)-propyl sulfite
2-chloroethyl 3-(o-tert.-butylphenoxy)-propyl sulfite
2-chloroethyl 3-(p-tert.-butylphenoxy)-propyl sulfite
2-chloroethyl 3-(p.-tert.-amylphenoxy)-propyl sulfite
2-chloroethyl 3-(p-octylphenoxy)-propyl sulfite
2-chloroethyl 3-(o-cyclohexylphenoxy)-propyl sulfite
2-chloroethyl 3-(p-cyclohexylphenoxy)-propyl sulfite
2-chloroethyl 3-(p-methoxyphenoxy)-propyl sulfite
2-chloroethyl 3-(4-n-propyl-2,6-dimethoxyphenoxy)-propyl sulfite
2-chloroethyl 3-(o-nitrophenoxy)-propyl sulfite
2-chloroethyl 3-(p-nitrophenoxy)-propyl sulfite
2-chloroethyl 3-(o-chloro-p-nitrophenoxy)-propyl sulfite
2-chloroethyl 3-(p-chloro-o-nitrophenoxy)-propyl sulfite
2-chloroethyl 3-(2-chloro-4-tert.-butylphenoxy)-propyl sulfite
2-chloroethyl 3-(2,6-dichloro-4-tert.-butylphenoxy)-propyl sulfite
2-chloroethyl 1-methyl-2-phenoxyethyl sulfite
2-chloroethyl 1-methyl-2-(1-naphthoxy)-ethyl sulfite
2-chloroethyl 1-methyl-2-(2-naphthoxy)-ethyl sulfite
2-chloroethyl 1-methyl-2-(o-chlorophenoxy)-ethyl sulfite
2-chloroethyl 1-methyl-2-(p-chlorophenoxy-ethyl sulfite
2-chloroethyl 1-methyl-2-(2,4-dichlorophenoxy-ethyl sulfite
2-chloroethyl 1-methyl-2-(2,4,5-trichlorophenoxy)-ethyl sulfite
2-chloroethyl 1-methyl-2-(2,4,6-trichlorophenoxy)-ethyl sulfite
2-chloroethyl 1-methyl-2-(2,4,5,6-tetrachlorophenoxy)-ethyl sulfite
2-chloroethyl 1-methyl-2-(pentachlorophenoxy)-ethyl sulfite
2-chloroethyl 1-methyl-2-(p-bromophenoxy)-ethyl sulfite
2-chloroethyl 1-methyl-2-(p-fluorophenoxy)-ethyl sulfite
2-chloroethyl 1-methyl-2-(o-methylphenoxy)-ethyl sulfite
2-chloroethyl 1-methyl-2-(m-methylphenoxy)-ethyl sulfite
2-chloroethyl 1-methyl-2-(p-methylphenoxy)-ethyl sulfite
2-chloroethyl 1-methyl-2-(p-ethylphenoxy-ethyl sulfite
2-chloroethyl 1-methyl-2-(p-isopropylphenoxy-ethyl sulfite
2-chloroethyl 1-methyl-2-(p-isobutylphenoxy)-ethyl sulfite
2-chloroethyl 1-methyl-2-(o-tert.-butylphenoxy)-ethyl sulfite
2-chloroethyl 1-methyl-2-(p-tert.-amylphenoxy)-ethyl sulfite
2-chloroethyl 1-methyl-2-(p-octylphenoxy)-ethyl sulfite
2-chloroethyl 1-methyl-2-(o-cyclohexylphenoxy)-ethyl sulfite
2-chloroethyl 1-methyl-2-(p-cyclohexylphenoxy)-ethyl sulfite
2-chloroethyl 1-methyl-2-(p-methoxyphenoxy)-ethyl sulfite
2-chloroethyl 1-methyl-2-(4-n-propyl-2,6-dimethoxyphenoxy)-ethyl sulfite
2-chloroethyl 1-methyl-2-(o-nitrophenoxy)-ethyl sulfite
2-chloroethyl 1-methyl-2-(p-nitrophenoxy)-ethyl sulfite 2 - chloroethyl 1 - methyl - 2 - (o - chloro - p-nitrophenoxy)-ethyl sulfite
2 - chloroethyl 1 - methyl - 2 - (p - chloro - o-nitrophenoxy)-ethyl sulfite
2 - chloroethyl 1 - methyl - 2 - (2 - chloro - 4-tert. butylphenoxy)-ethyl sulfite
2 - chloroethyl 1 - methyl - 2 - (2,6 - dichloro-4-tert.-butylphenoxy)-ethyl sulfite
2 - chloroethyl 2 - methyl - 2 - (phenoxy) - ethyl sulfite
2 - chloroethyl 2 - methyl - 2 - phenoxyethyl sulfite
2 - chloroethyl 2 - methyl - 2 - (1 - naphthoxy)-ethyl sulfite
2 - chloroethyl 2 - methyl - 2 - (2 - naphthoxy)-ethyl sulfite
2 - chloroethyl 2 - methyl - 2 - (o - chlorophenoxy)-ethyl sulfite
2 - chloroethyl 2 - methyl - 2 - (p - chlorophenoxy)-ethyl sulfite
2 - chloroethyl 2 - methyl - 2 - (2,4 - dichlorophenoxy)-ethyl sulfite
2 - chloroethyl 2 - methyl - 2 - (2,4,5 - trichlorophenoxy)-ethyl sulfite
2 - chloroethyl 2 - methyl - 2 - (2,4,6 - trichlorophenoxy)-ethyl sulfite
2 - chloroethyl 2 - methyl - 2 - (2,4,5,6 - tetrachlorophenoxy)-ethyl sulfite
2 - chloroethyl 2 - methyl - 2 - (pentachlorophenoxy)-ethyl sulfite
2 - chloroethyl 2 - methyl - 2 - (p - bromophenoxy)-ethyl sulfite
2 - chloroethyl 2 - methyl - 2 - (p - fluorophenoxy)-ethyl sulfite
2 - chloroethyl 2 - methyl - 2 - (o - methylphenoxy)-ethyl sulfite
2 - chloroethyl 2 - methyl - 2 - (m - methylphenoxy)-ethyl sulfite
2 - chloroethyl 2 - methyl - 2 - (p - methylphenoxy)-ethyl sulfite
2 - chloroethyl 2 - methyl - 2 - (p - ethylphenoxy)-ethyl sulfite
2 - chloroethyl 2 - methyl - 2 - (p - isopropylphenoxy)-ethyl sulfite
2 -chloroethyl 2 - methyl - 2 - (p - isobutylphenoxy)-ethyl sulfite
2 - chloroethyl 2 - methyl - 2 - (o - tert. - butylphenoxy)-ethyl sulfite
2 - chloroethyl 2 - methyl - 2 - (p - tert. - amylphenoxy)-ethyl sulfite
2 - chloroethyl 2 - methyl - 2 - (p - octylphenoxy)-ethyl sulfite
2 - chloroethyl 2 -methyl - 2 - (o - cyclohexylphenoxy)-ethyl sulfite
2 - chloroethyl 2 - methyl - 2 - (p - cyclohexylphenoxy)-ethyl sulfite
2 - chloroethyl 2 - methyl - 2 - (p - methoxyphenoxy)-ethyl sulfite
2 - chloroethyl 2 - methyl - 2 - (4 - n - propyl-2,6-dimethoxyphenoxy)-ethyl sulfite
2 - chloroethyl 2 - methyl - 2 - (o - nitrophenoxy)-ethyl sulfite
2 - chloroethyl 2 - methyl - 2 - (p - nitrophenoxy)-ethyl sulfite
2 - chloroethyl 2 - methyl - 2 - (o - chloro - p-nitrophenoxy)-ethyl sulfite
2 - chloroethyl 2 - methyl - 2 - (p - chloro - o-nitrophenoxy)-ethyl sulfite
2 - chloroethyl 2 - methyl - 2 - (2 - chloro - 4- tert. butylphenoxy)-ethyl sulfite
2 - chloroethyl 2 - methyl - 2 - (2,6 - dichloro-4-tert. butylphenoxy)-ethyl sulfite
2 - chloroethyl 4 - (p - chlorophenoxy) - butyl sulfite
2 - chloroethyl 4 - (p - tert. - butylphenoxy)-butyl sulfite Other examples of the sulfurous acid di-esters of the present invention are those having the same aryloxyalkyl radicals as in the above list but with the 2-chloroethyl radicals of each of the esters substituted by another chloroalkyl radical containing 2 to 4 carbon atoms and 1 to 3 chlorine atoms, for example, 2,2 - dichloroethyl, 2,2,2 - trichloroethyl, 2 - chloropropyl, 3 - chloropropyl, 2,3 - dichloropropyl, 2 - chloroisopropyl, 1 - chloromethyl - 2 - chloroethyl, 2,2 - dichloropropyl, 3,3 - dichloropropyl, 3,3,3 - trichloropropyl, 2 - chlorobutyl, 3 - chlorobutyl, 4 - chlorobutyl, 2,3 - dichlorobutyl, 2,4 - dichlorobutyl, 3,4 - dichlorobutyl, 1,1 - dimethyl - 2,2,2 - trichloroethyl radicals.

Specific illustrative examples of the preparation of the compounds of the present invention are shown in Examples I to V below.

EXAMPLE I

*Preparation of 2-chloroethyl 2-(p-chlorophenoxy)-ethyl sulfite*

2-chloroethyl chlorosulfinate was prepared as follows: Thionyl chloride (70 g.) was added to ethylene chlorohydrin (40 g.) at such a rate that the temperature did not rise above 35° C. Hydrogen chloride was evolved rapidly. The mixture was allowed to stand for two days protected from the moisture of the air by a calcium chloride tube. The reaction mixture was fractionally distilled, yielding 72 g. of 2-chloroethyl chlorosulfinate, a water-white liquid which boiled at 90–94° C./30 mm.

Ethylene glycol mono-p-chlorophenyl ether was prepared as follows: Sodium (23 g.) was dissolved in 500 cc. of anhydrous alcohol in a 1 liter 3-necked flask equipped with stirrer and reflux condenser. p-Chlorophenol (128.5 g.) was added and a dropping funnel was inserted in the third neck of the flask. The mixture was heated with stirring to reflux and ethylene chlorohydrin (80.5 g.) was added over a period of several minutes. Refluxing was continued for two hours. The sodium chloride was removed by filtration and washed with alcohol. The combined filtrates were concentrated by distillation and washed with very dilute sodium hydroxide, then with water. The solution was diluted with an equal volume of benzene, concentrated and finally fractionated under reduced pressure through a 6 inch Vigreaux column. The product (75 g.) was an almost colorless liquid which boiled at 135–136° C./6 mm.

The ethylene glycol mono-p-chlorophenyl ether (34.6 g.) with pyridine (16 g.) were dissolved in 300 cc. of dry ether. The 2-chloroethyl chlorosulfinate (32.6 g.) was added at such a rate that the ether refluxed gently. The reaction mixture was stirred thoroughly throughout the addition and for one-half hour thereafter. The pyridine hydrochloride was removed by filtration. The filtrate was washed with water and dried over anhydrous sodium sulfate. The solvent was distilled off and the product was fractionally distilled. The main fraction 2-chloroethyl 2-(p-chlorophenoxy)-ethyl sulfite (35 g., 58% yield) was a light yellow oil which boiled at 195–197° C./3 mm. Refractive index, $n]_D^{26}$ 1.5370.

EXAMPLE II

Preparation of 2-chloroethyl 1-methyl-2-(p-tert.-butyl phenoxy)-ethyl sulfite Propylene glycol mono - p - tert. - butylphenyl ether was prepared as follows: Propylene oxide (116 g.) was added through a dropping funnel to a solution of p-tert-butylphenol (300 g.) and sodium (4 g.) in 500 cc. of anhydrous alcohol. The resulting solution was refluxed for 18 hours. Most of the alcohol was removed by distillation and the resulting concentrate was washed with water. Fractionation through a 6 inch helix packed column under reduced pressure yielded a fore-run (31 g.) which boiled below 140° C./8 mm. The main fraction (353 g.) was a water-white liquid which distilled almost constantly at 140° C./8 mm. and solidified at about 35° to 40° C.

To a rapidly stirred solution of the propylene glycol mono-p-tert-butylphenyl ether (61.2 g.) and pyridine (29.7 g.) in 250 cc. of dry benzene, was added 2-chloroethyl chlorosulfinate (61.2 g.) prepared as in Example I. The reaction flask was cooled in a cold water bath throughout the addition. Stirring was continued for a few minutes after the addition was complete. The pyridine hydrochloride was removed by vacuum filtration. The filtrate was washed in cold water and dried over calcium chloride. After topping under reduced pressure, the product was distilled. The main fraction 2-chloroethyl 1-methyl-2-(p-tert.-butylphenoxy)-ethyl sulfite (yield 75.5 g.) was a yellow liquid which boiled at 200–210° C./7 mm. Refractive index, $n]_D^{27}$ 1.5075.

EXAMPLE III

Preparation of 3-chloropropyl 2-phenoxyethyl sulfite 3-chloropropyl chlorosulfinate was prepared by reacting trimethylene chlorohydrin (94.5 g.) with thionyl chloride (150 cc.) according to the procedure described for the preparation of 2-chloroethyl chlorosulfinate in Example I. The mixture was allowed to stand at room temperature for 3½ days. A 153 g. yield of a water-white liquid which boiled at 70° C./3 mm. was obtained.

Ethylene glycol-monophenyl ether was prepared by reacting ethylene chlorohydrin with phenol according to the procedure described in Example I for preparing the ethylene glycol mono-p-chlorophenyl ether.

3-chloropropyl 2-phenoxyethyl sulfite was prepared by reacting ethyleneglycol-monophenyl ether (27.6 g.), 3-chloropropyl chlorosulfinate (35.4 g.) and pyridine (16 g.) as described in Example I. Thirty grams of a colorless liquid which boiled at 185–6° C./2 mm. was obtained. Refractive index, $n]_D^{26}$ 1.5200.

EXAMPLE IV

Preparation of 2-chloroethyl 3-(p-tert.-butylphenoxy)-propyl sulfite

Trimethyl glycol mono - p - tert - butylphenyl ether was prepared as follows: Sodium (23 g.) was dissolved in 500 cc. of anhydrous alcohol. The solution was heated to reflux as p-tert-butylphenol (150 g.) was added. Trimethylene chlorohydrin (94.5 g.) was added rapidly through a dropping funnel and refluxing was continued for 4 hours. After removing the sodium chloride by filtration the solution was concentrated by distillation, washed with dilute alkali, then with water and finally distilled under reduced pressure. The product was a water-white slightly viscous liquid which distilled at 156–162° C./4. mm.

To a solution of the trimethylene glycol mono-p-tert-butylphenyl ether (41.6 g.) in benzene (250 cc.) and pyridine (19.8 g.), 2-chloroethyl chlorosulfinate (40.8 g.) prepared as in Example I, was added with stirring. The temperature was kept below 25° C. throughout by cooling in a water bath and by regulating the rate of addition. Stirring was continued for about 15 min. after addition was complete. The mixture was washed several times with water, topped and distilled under reduced pressure. The product distilled at 194–204° C./1.5 mm. as a pale straw-colored liquid. Refractive index, $n]_D^{21.5}$ 1.5132.

EXAMPLE V

Preparation of 2,2,2-trichloroethyl 2-phenoxyethyl sulfite 2,2,2-trichloroethyl chlorosulfinate was prepared by reacting 2,2,2-trichloroethyl alcohol (75 g.) with thionyl chloride (70 g.) according to the procedure described in Example I. It distilled at 58–60° C./2 mm.

2,2,2-trichloroethyl 2-phenoxyethyl sulfite was prepared by reacting the 2,2,2-trichloroethyl chlorosulfinate (12 g.) ethylene glycol monophenyl ether (7 g.) prepared as in Example III and pyridine (4 g.) in dry ether (100 cc.) according to the procedure described in Example I. The product was a light yellow oil (6.5 g.) which distilled at 170–180° C./1.5 mm. Refractive index, $n]_D^{25}$ 1.5364.

Boiling points and refractive indices of the above sulfite esters and various other sulfite esters prepared in the manner of the above examples are shown in the table below:

Table I

| Sulfite Ester | Boiling Point | Refractive Index (D line) |
|---|---|---|
| 2-chloroethyl 2-phenoxyethyl | Topped to 165° C./20 mm | 1.5371 at 22° C. |
| 2-chloroethyl 2-(p-methylphenoxy)-ethyl | 177–179° C./1.5 mm | 1.5230 at 26° C. |
| 2-chloroethyl 2-(o-chlorophenoxy)-ethyl | 188–191° C./2 mm | 1.5378 at 26° C. |
| 2-chloroethyl 2-(p-chlorophenoxy)-ethyl | 195–197° C./3 mm | 1.5370 at 26° C. |
| 2-chloroethyl 2-(2,4-dichlorophenoxy)-ethyl | 195–200° C./1 mm | 1.5483 at 26° C. |
| 2-chloroethyl 2-(p-tert-butylphenoxy)-ethyl | 196–198° C./2 mm | 1.5140 at 25° C. |
| 2-chloroethyl 2-(octyl-phenoxy)-ethyl | Not distilled | 1.5118 at 23° C. |
| 2-chloroethyl 1-methyl-2-phenoxyethyl | 168–170° C./2.3 mm | 1.5179 at 26° C. |
| 2-chloroethyl 1-methyl-2-(p-methylphenoxy)-ethyl | 180–182° C./2.5 mm | 1.5148 at 24° C. |
| 2-chloroethyl 1-methyl-2-(p-nitrophenoxy)-ethyl | Not distilled | 1.5532 at 24° C. |
| 2-chloroethyl 1-methyl-2-(p-chlorophenoxy)-ethyl | 185–187° C./2 mm | 1.5285 at 25° C. |
| 2-chloroethyl 1-methyl-2-(2,4-dichlorophenoxy)-ethyl | 210–222° C./7 mm | 1.5369 at 28° C. |
| 2-chloroethyl 1-methyl-2-(2,4,5-trichlorophenoxy)-ethyl | 222–236° C./6 mm | 1.5477 at 29° C. |
| 2-chloroethyl 1-methyl-2-(pentachlorophenoxy)-ethyl | 235–250° C./3 mm | 1.5700 at 20° C. |
| 2-chloroethyl 1-methyl-2-(p-tert-butylphenoxy)-ethyl | 200–210° C./7 mm | 1.5075 at 27° C. |
| 2-chloroethyl 1-methyl-2-(p-tert-amylphenoxy)-ethyl | 213–219° C./7 mm | 1.5092 at 26.5° C. |
| 2-chloroethyl 1-methyl-2-(β-naphthoxy)-ethyl | 228–236° C./4 mm | 1.5572 at 21° C. |
| 2-chloroethyl 1-methyl-2-(o-isopropylphenoxy)-ethyl | 183–190° C./2 mm | 1.5150 at 20.5° C. |
| 2-chloroethyl 1-methyl-2-(m-isopropylphenoxy)-ethyl | 180–195° C./1.5 mm | 1.5135 at 20.5° C. |
| 2-chloroethyl 1-methyl-2-(p-methylphenoxy)-ethyl | 190–195° C./2 mm | 1.5231 at 20.5° C. |
| 2-chloroethyl 1-methyl-2-(o-Cl-p-tert-butylphenoxy)-ethyl | 200–206° C./1 mm | 1.5230 at 20.5° C. |

| Sulfite Ester | Boiling Point | Refractive Index (D line) |
|---|---|---|
| 2-chloroethyl 1-methyl-2-(p-cyclohexylphenoxy)-ethyl | 210–233° C./2 mm | 1.5293 at 20.5° C. |
| 2-chloroethyl 3-(p-tert-butylphenoxy)-propyl | 194–204° C./1.5 mm | 1.5132 at 21.5° C. |
| 3-chloropropyl 2-phenoxy-ethyl | 185–186° C./2 mm | 1.5200 at 26° C. |
| 1-methyl-2-chloroethyl 2-phenoxyethyl | 170–172° C./2 mm | 1.5183 at 26° C. |
| 1-methyl-2-chloroethyl 1-methyl-2-(p-chlorophenoxy)-ethyl | 193–210° C./5 mm | 1.5210 at 28° C. |
| 2,3-dichloropropyl 2-(p-tert-butylphenoxy)-ethyl | 160–200° C./2.5 mm | 1.5203 at 25° C. |
| 2,3-dichloropropyl 1-methyl-2-(p-tert-butylphenoxy)-ethyl | 215–221° C./4 mm | 1.5130 at 25° C. |
| 2,2,2-trichloroethyl 2-phenoxyethyl | 170–180° C./1.5 mm | 1.5364 at 25° C. |

The following illustrates the effectiveness of the chemicals of the invention for controlling the Greenhouse red spider mite (*Tetranychus telarius*).

In the test on various chemicals of the present invention against Greenhouse red spider mites, rings of an adhesive preparation non-toxic to the organisms under test, such as is used on fly papers and for ringing trees, were placed around the borders of the upper surfaces of the leaves of growing pinto bean plants which were at the two-leaf stage. Greenhouse red spider mites were transferred to the thus treated leaves by placing infested bean leaves within the border of the adhesive preparation for 24 hours to effect transfer of the mites. The plants thus infested were then sprayed with aqueous emulsions of the various chemicals of the invention at the selected concentrations. The emulsions of the chemicals were prepared by dissolving in 10 parts of the sulfite 1 part of a commercial surface-active dispersing agent comprising the reaction product of castor oil and ethylene oxide and known to be non-toxic at the concentrations used to organisms under test, and then adding enough water to form a 1% emulsion of the sulfite ester. In order to obtain the various concentrations of the sulfite esters, amounts of this 1% emulsion were diluted with enough water to give the proper concentration. Observations were made after 48 hours to determine the kill of the mites. The results were reported as percent mortality of the mites.

The results of the tests with the various sulfite esters of the present invention are shown in the table below:

The extreme importance of the aryloxy substituent in the alkyl group of the aryloxyalkyl radical is attested to by the relative inactivity against *Tetranychus telarius* of the chloroalkyl unsubstituted-alkyl sulfite esters. 2-Chlorethyl ethyl sulfite gave only 5% kill of mites at 1:100 concentration, as compared with the very high mortality at much more dilute concentrations of the 2-chloroethyl aryloxyethyl sulfites of the present invention, as shown in the above table.

The chemicals of the present invention may be applied in various manners for the control of insects. They may be applied to loci to be protected against insects in undiluted form, or as dusts when admixed with or adsorbed on powdered solid carriers, such as the various mineral silicates, e. g. mica, talc, pyrophyllite and clays, or as liquids or sprays when in a liquid carrier, as in solution in a suitable solvent, or dispersed in a suitable non-solvent medium, for example, water. In protecting plants (the term including plant parts) which are subject to attack by insects, the chemicals of the present invention are preferably applied as aqueous emulsions containing a dispersing agent. The chemicals of the invention may be admixed with powdered solid carriers, such as mineral silicates, together with small amounts of a dispersing agent so that a wettable powder is obtained which may be applied directly to loci to be protected against insects, or which may be shaken up with water, to form a suspension of the chemical (and powdered carrier) in water for application in that form. The chemicals of the present invention may be applied to loci to be protected against insects by the aerosol method. Solutions for the aerosol

*Table II*

| Sulfite Ester | Per Cent Mortality of Mites at Indicated Concentrations | | | | |
|---|---|---|---|---|---|
| | 1:1,600 | 1:3,200 | 1:6,400 | 1:12,800 | 1:25,600 |
| 2-chloroethyl 2-phenoxyethyl | 90 | | | | |
| 2-chloroethyl 2-(p-methylphenoxy)-ethyl | 99 | 95 | | | |
| 2-chloroethyl 2-(o-chloro-phenoxy)-ethyl | 98 | 95 | 89 | | |
| 2-chloroethyl 2-(p-chloro-phenoxy)-ethyl | 100 | 100 | | | |
| 2-chloroethyl 2-(2,4-dichloro-phenoxy)-ethyl | 100 | 100 | 90 | | |
| 2-chloroethyl 2-(p-tert-butyl-phenoxy)-ethyl | 100 | 100 | 100 | | |
| 2-chloroethyl 2-(octyl-phenoxy)-ethyl | 100 | 96 | 85 | 100 | |
| 2-chloroethyl 1-methyl-2-phenoxy-ethyl | 100 | 100 | 98 | | |
| 2-chloroethyl 1-methyl-2-(p-methylphenoxy)-ethyl | 100 | 100 | 99 | | |
| 2-chloroethyl 1-methyl-2-(p-nitrophenoxy)-ethyl | 98 | 98 | 80 | | |
| 2-chloroethyl 1-methyl-2-(p-chlorophenoxy)-ethyl | 100 | 100 | 100 | 100 | |
| 2-chloroethyl 1-methyl-2-(2,4-dichlorophenoxy)-ethyl | | 100 | 100 | 100 | 90 |
| 2-chloroethyl 1-methyl-2-(2,4,5-trichlorophenoxy)-ethyl | | 100 | 100 | 86 | |
| 2-chloroethyl 1-methyl-2-(pentachlorophenoxy)-ethyl | | 91 | 92 | | |
| 2-chloroethyl 1-methyl-2-(p-tert-butylphenoxy)-ethyl | | 100 | 100 | 100 | 96 |
| 2-chloroethyl 1-methyl-2-(p-tert-amylphenoxy)-ethyl | | 100 | 100 | 98 | 98 |
| 2-chloroethyl 1-methyl-2-(β-naphthoxy)-ethyl | | 100 | 100 | 91 | 98 |
| 2-chloroethyl 1-methyl-2-(o-isopropylphenoxy)-ethyl | 100 | 100 | 95 | | 93 |
| 2-chloroethyl 1-methyl-2-(m-isopropylphenoxy)-ethyl | | 100 | 100 | 100 | |
| 2-chloroethyl 1-methyl-2-(p-methylphenoxy)-ethyl | | 100 | 100 | | |
| 2-chloroethyl 1-methyl-2-(o-Cl-p-tert-butylphenoxy)-ethyl | | | 100 | 100 | 100 |
| 2-chloroethyl 1-methyl-2-(p-cyclohexylphenoxy)-ethyl | | 100 | 100 | | 100 |
| 2-chloroethyl 3-(p-tert-butylphenoxy)-propyl | | 100 | 99 | | 93 |
| 3-chloropropyl 2-phenoxyethyl | 84 | | | | |
| 1-methyl-2-chloroethyl 2-phenoxyethyl | 98 | | | | |
| 1-methyl-2-chloroethyl 1-methyl-2-(p-chlorophenoxy)-ethyl | | 100 | 100 | 84 | 90 |
| 2,3-dichloropropyl 2-(p-tert-butylphenoxy)-ethyl | | 100 | 94 | | |
| 2,3-dichloropropyl 1-methyl-2-(p-tert-butylphenoxy)-ethyl | | 99 | | | |
| 2,2,2-trichloroethyl 2-phenoxyethyl | 100 | | | | | treatment may be prepared by dissolving the chemical directly in the aerosol carrier which is liquid under pressure but which is a gas at ordinary temperature (e. g. 20° C.) and atmospheric pressure, or the aerosol solution may be prepared by first dissolving the chemical in a less volatile solvent and then admixing such solution with the highly volatile liquid aerosol carrier. The chemicals may be used admixed with carriers that are active of themselves, for example, other insecticides, fungicides or bactericides.

Having thus described our invention, what we claim and desire to protect by Letters Patent is:

1. A di-ester of sulfurous acid wherein one of the esterifying groups is a chloroalkyl radical containing 2 to 4 carbon atoms and 1 to 3 chlorine atoms and having no chlorine atom attached to the alpha carbon atom, and wherein the other esterifying group is a radical of the formula R—O—X—, wherein R is selected from the class consisting of monovalent aryl hydrocarbon radicals and such radicals substituted by at least one member of the group consisting of alkyl, alkoxy, cycloalkyl, halo and nitro, and X is an alkylene radical having 2 to 4 carbon atoms.

2. A di-ester of sulfurous acid wherein one of the esterifying groups is a radical of the formula R—O—X—, wherein R is selected from the class consisting of monovalent aryl hydrocarbon radicals and such radicals substituted by at least one member of the group consisting of alkyl, alkoxy, cycloalkyl, halo and nitro, and X is an alkylene radical having 2 to 4 carbon atoms, and wherein the other esterifying group is a monochloroalkyl radical containing 2 to 4 carbon atoms in which at least one hydrogen atom is attached to the alpha carbon atom and in which the chlorine atom is attached to a carbon atom other than the alpha carbon atom.

3. 2-Chloroethyl 1-methyl-2-(p-tert.-butylphenoxy)-ethyl sulfite.

4. 2-Chloroethyl 2-(p-chlorophenoxy)-ethyl sulfite.

5. 2-Chloroethyl 3-(p-tert-butylphenoxy)-propyl sulfite.

6. A composition comprising a di-ester of sulfurous acid wherein one of the esterifying groups is a chloroalkyl radical containing 2 to 4 carbon atoms and 1 to 3 chlorine atoms and having no chlorine atom attached to the alpha carbon atom, and wherein the other esterifying group is a radical of the formula R—O—X—, wherein R is selected from the class consisting of monovalent aryl hydrocarbon radicals and such radicals substituted by at least one member of the group consisting of alkyl, alkoxy, cycloalkyl, halo and nitro, and X is an alkylene radical having 2 to 4 carbon atoms, and a surface-active dispersing agent.

7. A composition comprising a di-ester of sulfurous acid wherein one of the esterifying groups is a radical of the formula R—O—X—, wherein R is selected from the class consisting of monovalent aryl hydrocarbon radicals and such radicals substituted by at least one member of the group consisting of alkyl, alkoxy, cycloalkyl, halo and nitro, and X is an alkylene radical having 2 to 4 carbon atoms, and wherein the other esterifying group is a monochloroalkyl radical containing 2 to 4 carbon atoms in which at least one hydrogen atom is attached to the alpha carbon atom and in which the chlorine atom is attached to a carbon atom other than the alpha carbon atom, and a surface-active dispersing agent.

8. A composition comprising 2-chloroethyl 1-methyl - 2 - (p - tert. - butylphenoxy) - ethyl sulfite, and a surface-active dispersing agent.

9. A composition comprising 2-chloroethyl 2-(p-chlorophenoxy)-ethyl sulfite, and a surface-active dispersing agent.

10. A composition comprising 2-chloroethyl 3-(p-tert-butylphenoxy)-propyl sulfite, and a surface-active dispersing agent.

WALTER D. HARRIS.
HERMAN D. TATE.
JOHN W. ZUKEL.

REFERENCES CITED

The following references are of record in the file of this patent:

UNITED STATES PATENTS

| Number | Name | Date |
| --- | --- | --- |
| 2,377,418 | Hechenbleikner | May 26, 1945 |

OTHER REFERENCES

Carre et al: "Bull. soc. chim. France;" 4th series Vol. 53 (pt. 2) 1933 pp. 1070–75.